United States Patent [19]

Ichikawa et al.

[11] Patent Number: 5,242,883

[45] Date of Patent: Sep. 7, 1993

[54] EXHAUST GAS DISPOSABLE CATALYST AND METHOD OF MANUFACTURING THE SAME

[75] Inventors: Satoshi Ichikawa; Akihide Takami; Hideharu Iwakuni, all of Hiroshima, Japan

[73] Assignee: Mazda Motor Corporation, Hiroshima, Japan

[21] Appl. No.: 943,530

[22] Filed: Sep. 11, 1992

[30] Foreign Application Priority Data

Sep. 13, 1991 [JP] Japan ................... 3-234864

[51] Int. Cl.$^5$ .................. B01J 37/03; B01J 32/00; B01J 35/10; B01J 21/04
[52] U.S. Cl. .................. 502/439; 502/346; 502/334; 502/332
[58] Field of Search ............... 502/327, 355, 439, 346, 502/334, 332

[56] References Cited

U.S. PATENT DOCUMENTS

| | | | |
|---|---|---|---|
| 4,273,735 | 6/1981 | Jacques et al. | 502/8 |
| 4,397,770 | 8/1983 | Cairns et al. | 502/327 X |
| 4,514,511 | 4/1985 | Jacques et al. | 502/355 X |
| 4,621,071 | 11/1986 | Blanchard et al. | 502/327 X |
| 5,134,107 | 7/1992 | Narula | 502/439 X |

FOREIGN PATENT DOCUMENTS 2233142 9/1990 Japan.

*Primary Examiner*—W. J. Shine
*Assistant Examiner*—Douglas J. McGinty
*Attorney, Agent, or Firm*—Sixbey, Friedman, Leedom & Ferguson

[57] ABSTRACT

In an exhaust gas disposable catalyst which is a γ-alumina catalyst prepared by sol-gel process, γ-alumina has more than 300 m$^2$/g specific surface area and the catalyst element is supported on the γ-alumina and dispersed in pores thereof. The exhaust gas disposable catalyst is obtained by adding the catalyst element as a solution of salt before gelating in sol-gel process.

7 Claims, 2 Drawing Sheets

EXHAUST GAS DISPOSABLE CATALYST AND METHOD OF MANUFACTURING THE SAME

BACKGROUND OF THE INVENTION

This invention relates to an exhaust gas disposable catalyst having a superior property of decomposing NOx and a method of manufacturing the same.

In order to follow fuel restrictions for a mobile engine, it is planned to employ a lean-burn engine. Further, it should be prevented as possible to exhaust NOx in gas exhausted from the engine to the air.

In some proposed methods for preventing the NOx gas exhaustion, in case with a mobile engine, it is practiced to decompose NOx by providing a catalyst converter at an exhaust pipe of the engine. Insufficient decomposition of NOx is obtained by a conventional three way catalyst, however, in case of high concentration of oxygen in the exhaust gas.

As a catalyst for effectively decomposing NOx, there is a known zeolite catalyst supporting copper by eon-exchange and a γ-alumina catalyst. Another technique has been disclosed in Japanese Patent Application Laying Open Gazette No.1-139144 that a catalyst composed of a mixture of zeolite supporting a transition element by ion-exchange and alumina supporting a catalyst element is used for decomposing NOx.

In spite of the high-level decomposing rate (catalytic conversion efficiency) of over 90% in a laboratory, however, in an actual mobile engine, the catalyst for decomposing the above mentioned NOx has a problem that the catalyst cannot decompose NOx effectively because:

a) the temperature of an actual exhaust gas of an automobile does not necessarily accord with a temperature of the catalyst capable of decomposing Nox (activation temperature);

b) a composition of the actual exhaust gas of the automobile is delicately different from that at a rig test in a laboratory; and c) an actual exhaust gas flow of the automobile is faster than that at a rig test in a laboratory.

The temperature of the actual exhaust gas shall rises high to 800°-900° C. according to an operational condition of the engine, which causes an insufficient heat resistance with the zeolite as a catalyst supporter.

Moreover, in a γ-alumina catalyst in which γ-alumina supports an element having a catalysis, the element of the catalyst is merely, physically supported by the γ-alumina. Hence, the catalyst element is attrited owing to an external force such as vibration.

The present invention has its object to provide a catalyst capable of effectively decomposing the exhaust gas of a mobile engine which is actually used. In detail, the object is to provide an exhaust gas disposable catalyst which has high durability under the above mentioned high exhaust gas temperature and excellent NOx decomposing power under conditions at low exhaust gas temperature and with lean mixture.

Another object of the present invention is to provide a method of manufacturing the catalyst having the above superior property.

SUMMARY OF THE INVENTION

The above mentioned objects are attained by an exhaust gas disposable catalyst and a method of manufacturing the same according to the present invention.

In detail, the exhaust gas disposable catalyst obtained by a sol-gel process and in which γ-alumina supports a catalyst element, comprises the γ-alumina a specific surface area of which is more than 300 $m^2/g$, and the catalyst element at least a part of which disperses in pores of the γ-alumina.

As the catalyst element, Cu and Co are suitable but other transition element such as Cr, Ni, Fe, Mn, Zr, Mo, Zn Y, Ce, Tb, or noble metal such as Pt, Rh are preferable. In addition, a combination of more than two kinds of different transition element or that of transition element and typical elements such as Ca, Mg, Ge, Ga Sn, Pb, Bi may be used.

The specific surface area is set more than 300 $m^2/g$ in order to obtain a high property of decomposing NOx.

Since the γ-alumina has the large specific surface area of more than 300 $m^2/g$, the catalyst displays the superior NOx decomposing power under coexistence of HC (hidro-carbon) as a reducing agent contained in the exhaust gas. Particularly, since the catalyst element partially exists in the pores of the γ-alumina and a dispersion degree in the γ-alumina is high, the catalyst can effectively decompose NOx even under the conditions at low exhaust gas temperature and with the lean mixture. Thus, lowering of catalytic activity owing to the external element such as vibration, heat is decreased.

A method of manufacturing the exhaust gas disposable γ-alumina catalyst having the large specific surface area and in which the catalyst element is supported and at least a part of the catalyst element disperses in the pores of the γ-alumina, comprises the steps of:

a) a forming step of mixing aluminum alkoxide and glycol;

b) a catalyst element adding step of adding a solution of the catalyst element to the sol;

c) a gelating step of aggregating the sol to which the catalyst element is added to obtain a gel;

d) a drying step of drying the gel; and e) a heating step of dissociating by mainly thermal cracking a macromolecule which is made of the glycol and is a component of the dried gel.

In detail, at the stage of gelation, the glycol reacts with aluminum alkoxide to be macromolecule with shape and length not fixed. Then the catalyst element in solution is added to the sol made of a mixture of aluminum alkoxide and glycol, which is the most important step in the present invention. Accordingly, since the catalyst element exists in the gel which is a precursor of the γ-alumina, the γ-alumina is generated by a dissociation by thermal cracking the macromolecule, while the catalyst element evenly disperses through the γ-alumina, even in the inner surface of the pores thereof, and is supported on the γ-alumina.

Comparing the method of the present invention with a conventional immersing method (for making the γ-alumina support the catalyst element by immersing the γ-alumina into the solution of the catalyst element), the catalyst element can be supported at the uppermost surface of the γ-alumina but cannot be supported at the inner surface of the pores therein in case of the immersing method. Because each diameter of the pores of the γ-alumina is equal to or less than 100 angstrom, so that the catalyst element cannot get into the pores, which might cause to blockade the pores.

On the contrary, in the method of the present invention, the catalyst element exists in the gel which is a precursor of the γ-alumina, so that the γ-alumina supporting the catalyst element is formed. This means not only the evenly dispersion of the catalyst element but also the γ-alumina supporting it even in the pores. In consequence, the catalyst with high heat resitance, long catalyst life and superior NOx decomposing power is obtained.

As the aluminum alkoxide, aluminum isopropoxide is suitable but other aluminum alkoxide such as aluminum methoxide, aluminum ethoxide may be used.

As the glycol, hexylene glycol is suitable but other glycol may be used. Wherein, glycol having short carbon-chain (ethylene glycol and the like), a short configuration interval between two hydroxide bases, or a hydroxide base at a transposition (1,2- or 1,4-cychrohexane diol and the like) cannot increase the specific surface area of the γ-alumina so much. The glycol with long carbon-chain has disadvantages of its expensiveness and of low reaction property with aluminum alkoxide. Consequently, the glycol with 5-8 carbon number is suitable.

It is suitable to carry out the catalyst element adding step by adding an aqueous solution of the catalyst element to the sol and to carry out the gelating step by hydrolysis with the aqueous solution of the catalyst element. Because adding the aqueous solution of the catalyst element to the sol causes hydrolysis without additional step of adding water, thus facilitating the gelation.

It is also preferable that dissociation of macromolecule by the thermal cracking at the heating step is carried out in a stove in which the macromolecule is sufficiently exposed to the air, a stove with an inert gas atmosphere or a stove under a reduced pressure.

When the heating step is carried out under the conditions exposed sufficiently to the air, the γ-alumina catalyst precursor is thermal-cracked in a short time. Hence, the pores generated at the γ-alumina are prevented from being sintered, so that the specific surface area is increased. In reverse, the heating step under an atmosphere of insufficient air causes incomplete combustion to the precursor for a long period or time and sintering of the pores, thus decreasing the specific surface area.

Further, the heating step with the inert gas atmosphere prevents organic matter within the precursor from being burnt and prevents the pores from being sintered, which leads to the γ-alumina catalyst with a large specific surface area.

In addition, the heating step under the reduced pressure prevents organic matter within the precursor from being burnt and prevents the pores from being sintered. Further, since radical is generated at a stage of thermal-cracking the macromolecule and moves drastically in the precursor, a lot of pores are generated in the γ-alumina catalyst, which leads to a large specific surface area.

Other and further objects, features and advantages of the present invention will appear more fully from the following description.

PREFERRED EMBODIMENTS OF THE INVENTION

FIRST EMBODIMENT

A γ-alumina catalyst supporting a catalyst element obtained by a following preparation.

120 g aluminum isopropoxide and 108 g hexylene glycol are mixed, then the mixed liquid is agitated in a rotary evaporator at 120° C. for four hours to obtain sol.

90 ml aqueous solution of catalyst element whose concentration is prepared beforehand so as to be a set supporting amount that the γ-alumina supports the catalyst element is added to the sol under a condition at 85° C., then is gelated by hydrolysis.

The solution of the catalyst element to be added to the sol is a solution of at least one kind of acetate, nitrate or the like, such as Cu, Co, Rh, Pt. The supporting amount that the γ-alumina supports the catalyst element is favorable to be about 10 wt % in case of Cu, Co and Rh, and about 0.1 wt % in case of Pt.

Next, the gel is maintained at 80° C. for sixteen hours for aging, then obtained is a precursor of γ-alumina catalyst by drying by a rotary evaporator with a pressure reduced. The precursor is heat-treated by maintaining for three hours at 600° C.

Figure 1:
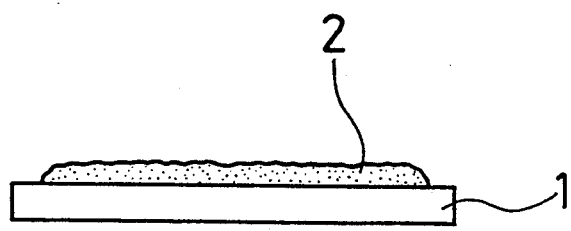
FIG. 1 is an explanatory drawing showing a step of heating a gel in one of the embodiment of the present invention.

As shown in FIG. 1, the heat-treatment is carried out in such a manner that the precursor 2 is placed on an upper surface of a tray 1 made of alumina, preferably, to be a thin layer of less than 2 mm thickness, then each part of the precursor 2 is exposed sufficiently to the air. Thereafter, the precursor is inserted into an electric furnace for three hours at 600° C. for heat-treatment to obtain a γ-alumina catalyst.

SECOND EMBODIMENT

The same steps as the first embodiment are carried out until the above mentioned precursor is obtained.

At the heat-treatment, the precursor is placed on the upper surface of the alumina tray 1 to be a thin layer as in the first embodiment, then inserted into a stove capable of controlling the atmosphere. The stove with an inert gas atmosphere using nitrogen gas is used in this embodiment, however the one using argon gas may be also used.

After three-hour heat-treatment of the precursor 2 at 600° C. under the inert gas atmosphere, a γ-alumina catalyst is obtained.

THIRD EMBODIMENT

The same steps as the first embodiment are carried out until the above mentioned precursor is obtained.

At the heat-treatment, the precursor 2 is placed on the upper surface of the alumina tray 1 to be a thin layer as in the first embodiment, then inserted into a vacuum stove which is capable of heat-treating under a reduced pressure. In this embodiment, the atmosphere of reduced pressure in the vacuum stove is set to be in a range from $10^{-1}$ to $10^{-3}$ Torr.

After three-hour heat-treatment of the precursor 2 at 600° C. under the atmosphere of the reduced pressure, a γ-alumina catalyst is obtained.

Through the three embodiments, in case at less than 600° C. of heat-treating temperature for the precursor or with less than three hours of the heat-treating period, the specific surface area decreases owing to remaining carbon composing macromolecule in the precursor in the γ-alumina catalyst.

On the contrary, in case at more than 600° C. of heat-treating temperature for the precursor or with more than three hours of the heat-treating period, the specific surface area also decreases owing to the sintering caused.

COMPARATIVE EXAMPLE

The same steps as the first embodiment are carried out until the above mentioned precursor is obtained.

Figure 2:
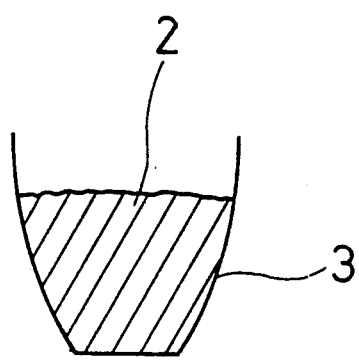
FIG. 2 is an explanatory drawing showing a step of heating a gel in a conventional example.

The heat-treatment is carried out, as shown in FIG. 2, in such a manner that the gel 2 poured in a conventional crucible 3 is inserted into a conventional electric furnace, then heat-treated for three hours at 600° C. to obtain a γ-alumina catalyst.

In the comparative example, the macromolecule remains in the precursor 2 at its portions corresponding to a middle part and a bottom part of the crucible 3. As a result, the obtained γ-alumina catalyst has less specific surface area.

Study for Relation between Specific Surface Area and NOx Decomposing Rate

Reviewing first to third embodiments and the comparative example, as indicated in Table 1, the γ-alumina catalysts of first, second and third embodiments have evenly formed pores in the respective γ-alumina to be a supporter, so that large specific surface area is obtained, compared with the comparative example.

A decomposition test with imitation exhaust gas is conducted for demonstrating an influence of the specific surface area. Each γ-alumina of each embodiment having a large specific surface area has high NOx decomposing rate, as indicated in Table 1, compared with the comparative example having less specific surface area.

TABLE 1

|  | First | Second Embodiment | Third | Comparative Example |
|---|---|---|---|---|
| specific surface area (m$^2$/g) | 330 | 416 | 468 | 272 |
| maximum NOx decomposing rate (%) | 78.4 | 85.7 | 91.3 | 62.5 |

The test conditions for measuring the NOx decomposing rate in Table 1 is as follows.

NO: 1040–1110 ppm, C$_3$H$_6$: 1250–1316 ppm, O$_2$: 9.6–10.8%, SV: 1200 h$^{-1}$ (He balance), weight of catalyst element: 1.0 g

Study for Relation between NOx Decomposing Rate and Supporting Amount of Catalyst Element and Catalyst Element Adding Timing to Sol-gel System As for the γ-alumina catalyst of the first embodiment, Table 2 indicates a relation between the catalyst element supporting amount of the γ-alumina and maximum NOx decomposing rate, comparing with the comparative example.

Further shown in Table 3 are influences which a timing of adding the catalyst element solution (copper (II) acetate solution whose supporting amount is 10 wt %) to the sol-gel system gives to the maximum NOx decomposing rate (catalytic activity).

TABLE 2

| catalyst element | supporting amount | maximum NOx decomposing rate First Embodiment | decomposing rate Comparative Example |
|---|---|---|---|
| Cu | 10.0% | 21.3% | 14.4% |
| Co | 10.0% | 13.7% | 7.9% |
| Rh | 10.0% | 19.5% | 11.8% |
| Pt | 0.1% | 12.2% | 8.3% |

TABLE 3

| adding timing and amount of catalyst element solution | maximum NOx decomposing rate |
|---|---|
| before gelated (40 wt %) | 21.3% |
| after gelated (10 wt %) | 16.7% |
| after drying gel (40 wt %) | 17.1% |
| after heat-treated (Conventional Example) (40 wt %) | 14.4% |

The test conditions for measuring NOx decomposing rate in Tables 2 and 3 are as follows.

NOx: 2000 ppm, HC: 6000 ppmC, O$_2$: 8.0%, CO: 0.18%, CO$_2$: 8.4%, SV: 25000 h$^{-1}$ (N$_2$ balance)

According to the results indicated in Tables 2 and 3, it is clear that the γ-alumina catalyst obtained in the present invention which supports the catalyst element has superior NOx decomposing power to the comparative example and the conventional example.

FOURTH EMBODIMENT

This embodiment is conducted for searching an optimum catalyst element supporting amount of the γ-alumina in the γ-alumina catalyst. In other words, relation between the supporting amount and the maximum NOx decomposing rate is confirmed based on the above results and with Cu selected as the catalyst element.

In detail, a mixture of 240 g aluminum isoproxide and 220 g hexylene glycol is agitated for five hours at 120° C. by a rotary evaporator to obtain sol.

200 ml copper acetate solution whose concentration is set to be the respective supporting amount in Table 4 is added to the sol under the condition at 100° C., then hydrolysis (aggregation) are carried out to gelate.

Then, after the gel is aged by leaving alone for 20 hours at 85° C. and dried under a reduced pressure, heat-treatment is carried out with the same means as in the first embodiment.

Measured are the respective maximum NOx decomposing rates of the present invention (fourth embodiment) and the conventional example wherein the catalyst element is added after the heat-treatment of the gel. The results thereof are indicated in Table 4.

TABLE 4

|  | catalyst element supporting amount | maximum NOx decomposing rate |
|---|---|---|
| present invention | 5.0% | 17.6% |
|  | 10.0% | 21.3% |
|  | 20.0% | 24.8% |
|  | 30.0% | 19.7% |
| conventional example | 10.0% | 14.4% |

The test conditions for measuring the maximum NOx decomposing rate in Table 4 are the same as in Tables 2 and 3.

In this invention, the catalyst element supporting amount is 5–30 wt %, which is favorable.

In this case, it is favorable that the catalyst element supporting amount is 2–30 wt %. In case that the catalyst element is a kind of noble metal, the supporting amount is desirable to be more than 1 wt %, preferably in a range from 1.5 to 10 wt %.

The specific surface area of the γ-alumina itself is desirable to be more than 300 m$^2$/g and each pore of the γ-alumina having such the specific surface area has a diameter of 5–60 angstrom. In consequence, the large catalyst element supporting amount is desirable as far as the pores are not blockaded.

FIFTH EMBODIMENT

The γ-alumina catalyst in which the γ-alumina having the large specific surface area supports the catalyst element according to the present invention is easy to be wash-coated to a honeycomb thanks to the high surface potential. Also, since the metal is solid-state-diffused to the honeycomb after heated, the strength of an interface between the catalyst and the honeycomb is enhanced.

This embodiment is worthy of confirming that the increase of the strength of the interface makes an attrition amount of the γ-alumina catalyst from the honeycomb so little.

The γ-alumina catalyst the specific surface area of which is 360 m$^2$/g is prepared by adding to the sol an aqueous solution of cupric nitrate whose concentration corresponds to 5 wt % supporting amount at the sol-gel process.

The γ-alumina catalyst is suspended in a solvent to obtain a slurry. On the other hand, a slurry of only the γ-alumina is prepared.

Figure 3:
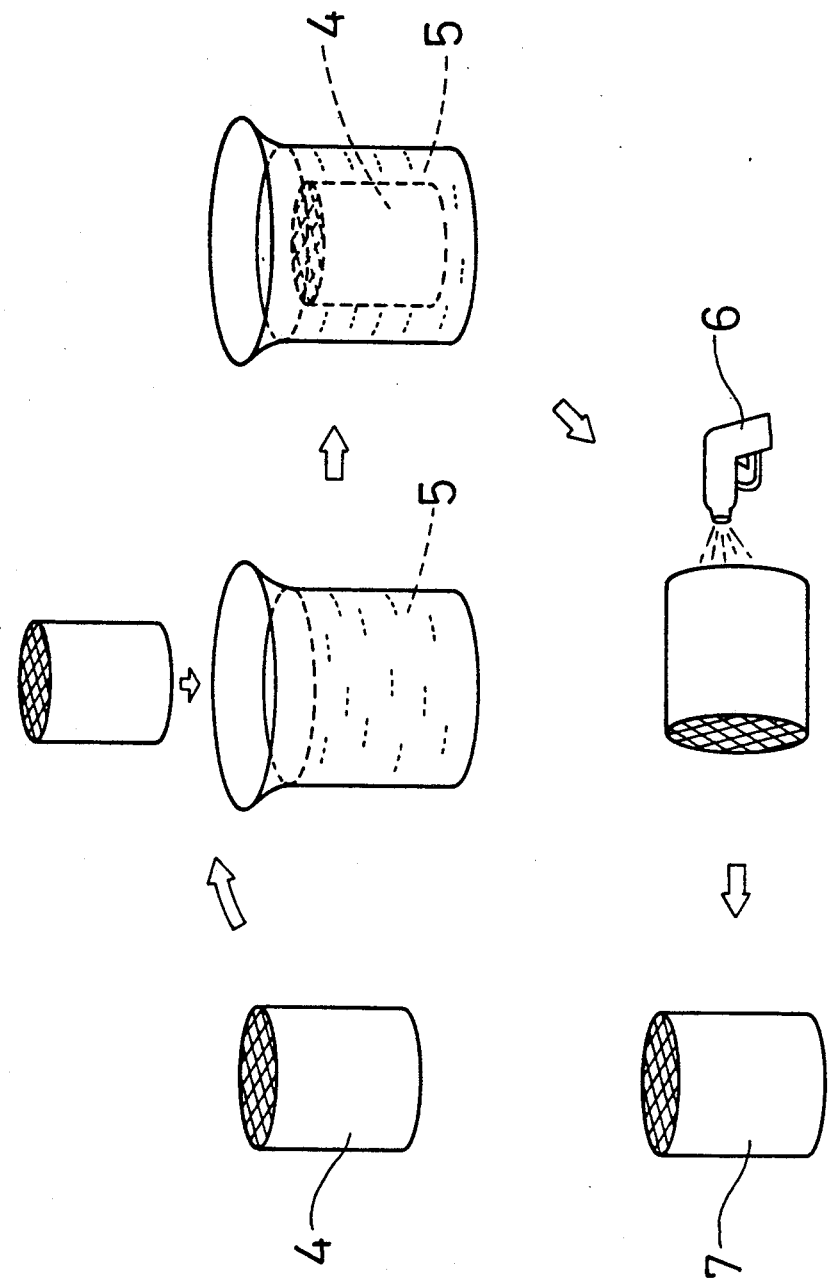
FIG. 3 is an explanatory drawing showing an operation order of steps of wash-coating a catalyst slurry to a honeycomb.

The two kinds of slurries are wash-coated to a honeycomb by means indicated in FIG. 3. In detail, the honeycomb 4 is immersed in the slurry 5 poured in a vessel. After the slurry 5 is sufficiently adhered to the honeycomb 4, the honeycomb 4 is get out from the slurry 5, then surplus slurry 5 is removed by a jet blower 6 to obtain a wash-coated honeycomb 7.

The weight of the wash-coated honeycomb 7 is measured after drying for 30 minutes at 200° C. Thereafter, the weight thereof is measured after firing for one hour at 450° C.

Next, the weight thereof is measured after throwing down on a concrete floor from one-meter-height for giving an impact.

In the honeycomb wash-coated with only the alumina slurry, an attrition amount of the wash-coat by the impact is 25% on an average. On the other hand, in the honeycomb wash-coated by the γ-alumina catalyst slurry according to the present invention, the attrition amount of the wash-coat by the impact is saved in 12.5% on the average. No differences between both wash-coated slurries are shown in the respective weights after dried and after fired.

According to the above results, the γ-alumina catalyst of the present invention displays a superior supporting property to the honeycomb.

We claim:

1. A method of manufacturing an exhaust gas disposable γ-alumina catalyst having a large specific surface area and in which catalyst element is supported and at least a part of said catalyst element is dispersed in pores of said γ-alumina, comprising the steps of:
    a) a forming step of mixing aluminum alkoxide and glycol to produce a sol;
    b) a catalyst element adding step of adding a solution of said catalyst element to said sol;
    c) a gelating step of aggregating said sol to which said catalyst element is added to obtain a gel; and
    d) a drying step of drying said gel
    e) a heating step of dissociating by mainly thermal cracking a macromolecule which is made of said glycol and is a component of said dried gel.

2. The method of manufacturing an exhaust gas disposable catalyst as defined in claim 1, wherein said heating step is carried out at 600° C. for 3 hours.

3. The method of manufacturing an exhaust gas disposable catalyst as defined in claim 1, wherein said catalyst element adding step is carried out by adding an aqueous solution of said catalyst element, and said gelating step is carried out by hydrolysis by said aqueous solution.

4. The method of manufacturing a exhaust gas disposable catalyst as defined in claim 1, wherein said heating step is carried out in a stove in which said gel is sufficiently exposed to the air.

5. The method of manufacturing a exhaust gas disposable catalyst as defined in claim 1, wherein said heating step is carried out in a stove with an inert gas atmosphere.

6. The method of manufacturing a exhaust gas disposable catalyst as defined in claim 1, wherein said heating step is carried out under a reduced pressure.

7. The method of manufacturing an exhaust gas disposable catalyst as defined in claim 1, wherein said glycol is a hexylene glycol.

* * * * *